United States Patent [19]

Ballmer

[11] Patent Number: 4,512,637
[45] Date of Patent: Apr. 23, 1985

[54] METHOD AND MEANS FOR STEPWISE CHARGE CONTROL OF ELECTROCHROMIC LAYERS

[75] Inventor: Horst Ballmer, Heidenheim, Fed. Rep. of Germany

[73] Assignee: Carl-Zeiss-Stiftung, Heidenheim/Brenz, Oberkochen, Fed. Rep. of Germany

[21] Appl. No.: 436,173

[22] Filed: Oct. 22, 1982

[30] Foreign Application Priority Data

Oct. 29, 1981 [DE] Fed. Rep. of Germany ....... 3142906

[51] Int. Cl.³ .................................................. G02F 1/23
[52] U.S. Cl. ...................................... 350/357; 340/785
[58] Field of Search ................. 350/357; 340/785, 763

[56] References Cited

U.S. PATENT DOCUMENTS

| | | | |
|---|---|---|---|
| 4,219,809 | 8/1980 | Schwartzchild et al. | 350/357 X |
| 4,228,431 | 10/1980 | Barclay et al. | 350/357 X |
| 4,262,290 | 4/1981 | Vallins | 340/793 X |
| 4,427,979 | 1/1984 | Clerc et al. | 340/793 X |

OTHER PUBLICATIONS

J. Bruinink, "Electrochromic Display Devices", Sep. 1975, §3.4.

*Primary Examiner*—John K. Corbin
*Assistant Examiner*—Lynn Vandenburgh Kent
*Attorney, Agent, or Firm*—Hopgood, Calimafde, Kalil, Blaustein & Judlowe

[57] ABSTRACT

In order to control the absorptance of an electrochromic layer, the invention provides a plurality of steps for establishing different levels of coloring action. Quantities of charge are supplied to and removed from the layer, via one or the other of two constant-current sources, timed with clock pulses to a forward/backward counter. For decoloring processes, smaller quantities of charge are removed from the layer than are supplied to it during a corresponding coloring process. The quantities of charge removed for decoloring processes are, however, slightly greater than the quantities of removed charge needed to reach steps having exactly the same absorptance, so that even in the case of numerous changes between the color steps, destruction of the layer is definitely avoided. Preferred fields of use are lenses, particularly eyeglass lenses, filters and dimmable mirrors, each having an applied electrochromic layer whose absorptance is controlled for step-wise change.

17 Claims, 4 Drawing Figures

METHOD AND MEANS FOR STEPWISE CHARGE CONTROL OF ELECTROCHROMIC LAYERS

BACKGROUND OF THE INVENTION

The present invention relates to a method and apparatus for controlling the absorptance of an electrochromic layer.

Electrochromic layers become dark upon the application of a voltage or upon the feeding of charges, i.e., their absorptance increases (coloring). Upon the removal of charges, the layers again become transparent (decoloring).

It is known to utilize this phenomenon for display elements, in which case only the transparent and colored states are used. In this connection, to effect coloring, a defined current is supplied for a defined period of time. An excessive supply of charge must be avoided, if destruction of the electrochromic layer is to be avoided. On the other hand, the decoloring process is not critical since a greater charge cannot be removed from the layer than is present in it, and the completely charge-free layer is also the layer having the lower absorptance. One essential advantage of electrochromic layers is that they consume current only during the change in their absorptance.

For display elements, two states of the electrochromic layer are sufficient. However, for other purposes of use, as for sunglasses, dimmable mirrors and optical filters, intermediate values are advantageous or necessary. If identical charging and discharging times with identical charging and discharging currents, i.e., identical supply and removal of charges, are used for recycled charging and discharging between such intermediate values, then the layer will become brighter and brighter, since more charge is required for coloring of an electrochromic layer than can be removed for its decoloring.

BRIEF STATEMENT OF THE INVENTION

The object of the present invention is to provide a method and an arrangement for charging and discharging electrochromic layers, making it possible to additionally set intermediate values of absorptance, and with which acceptable reproducibility is obtained in spite of multiple changes between intermediate values, while also avoiding such accumulation of charge as could result in destruction of the layer.

The invention achieves this object by providing selective availability of desired absorptance among a plurality of predetermined steps (in the nature of a step wedge) of progressively increased absorptance, by assuring that smaller quantities of charge are removed for layer-decoloring processes than are supplied for corresponding layer-coloring processes, and by providing that the quantities of removed charge for decoloring from one step to another are slightly greater than the quantities of removed charge which are necessary to attain steps of exactly the same absorptance.

Briefly stated, the invention is characterized by the fact that the coloring and decoloring processes are started and stopped by a comparator which compares a guide value with the value of a forward/backward (i.e. up/down) counter, and that during a coloring or a decoloring process charges are supplied to or removed from the electrochromic layer by one of two constant-current sources while counting pulses are delivered by a clock generator to a forward/backward counter, whereby the counted value characterizes the colored state of the layer.

A first advantageous embodiment is characterized by the fact that the electrochromic layer is connected to two constant-current sources via which charges are supplied or removed; that switch inputs of the constant-current sources are connected to a comparator which is also connected to circuitry for predetermining a desired value and to a binary forward/backward counter; that the forward/backward counter is connected to a clock generator; and that, when the signals present at the comparator are unequal, charges are supplied to or removed from the layer via the constant-current sources, and counting pulses are fed by the clock generator to the forward/backward counter, the frequency of the clock generator being greater during the decoloring process than during the coloring process.

In this connection, however, the clock frequency for decoloring is set slightly too low so that, for any given change of absorptance, the electrochromic layer is always decolored slightly more than it is colored. In this way, the layer can never receive too much charge (i.e., to the point of its destruction), even in the case of frequent change between intermediate steps. The slightly excessive decoloring of the layer is effectively neutralized upon each adjustment to the completely decolored state, since no more than an existing charge can ever be removed from the layer.

In another embodiment, the charging and charge-removing currents of the constant-current sources are adjusted to different levels and their timing is served by the same clock frequency, such that the unequal quantity of charge for coloring and decoloring is also compensated for. In this case, charge-removing current is adjusted slightly too great so as definitely to avoid excessive charge accumulation and destruction of the layer, should there be frequent change between intermediate steps.

In both embodiments, it is advantageous to provide transistors as the sources of constant current, under control via their base resistors.

The maximum possible charge for coloring the layer is limited in all embodiments by the maximum possible binary combination of the guide value, while intermediate steps of progressive absorptance are represented by the available lesser binary combinations.

In a preferred arrangement, push keys are provided for selection of different guide values; actuation of the keys is operative to store the corresponding guide value in binary form in a coding and storage device. And it is particularly advantageous to provide automatic control through brightness-controlled production of the guide value. In that case, signal output of a photodiode in front of the electrochromic layer is converted either by a comparator chain or by a plurality of operational amplifiers (connected as difference-voltage compensators, with hysteresis and logic components), into the same binary signals as if they had been preselected by push-key actuation.

Another advantageous feature of the invention resides in the use of a plurality of clock frequencies or charging currents for the coloring process. And increased reproducibility of intermediate-step values is realized by providing for initiation of a new coloring or decoloring process only when the system is at rest or when a defined state has been achieved during a coloring or decoloring process which is still taking place.

DETAILED DESCRIPTION

The invention will be described in further detail in conjunction with the accompanying drawings, in which.

Figure 1:
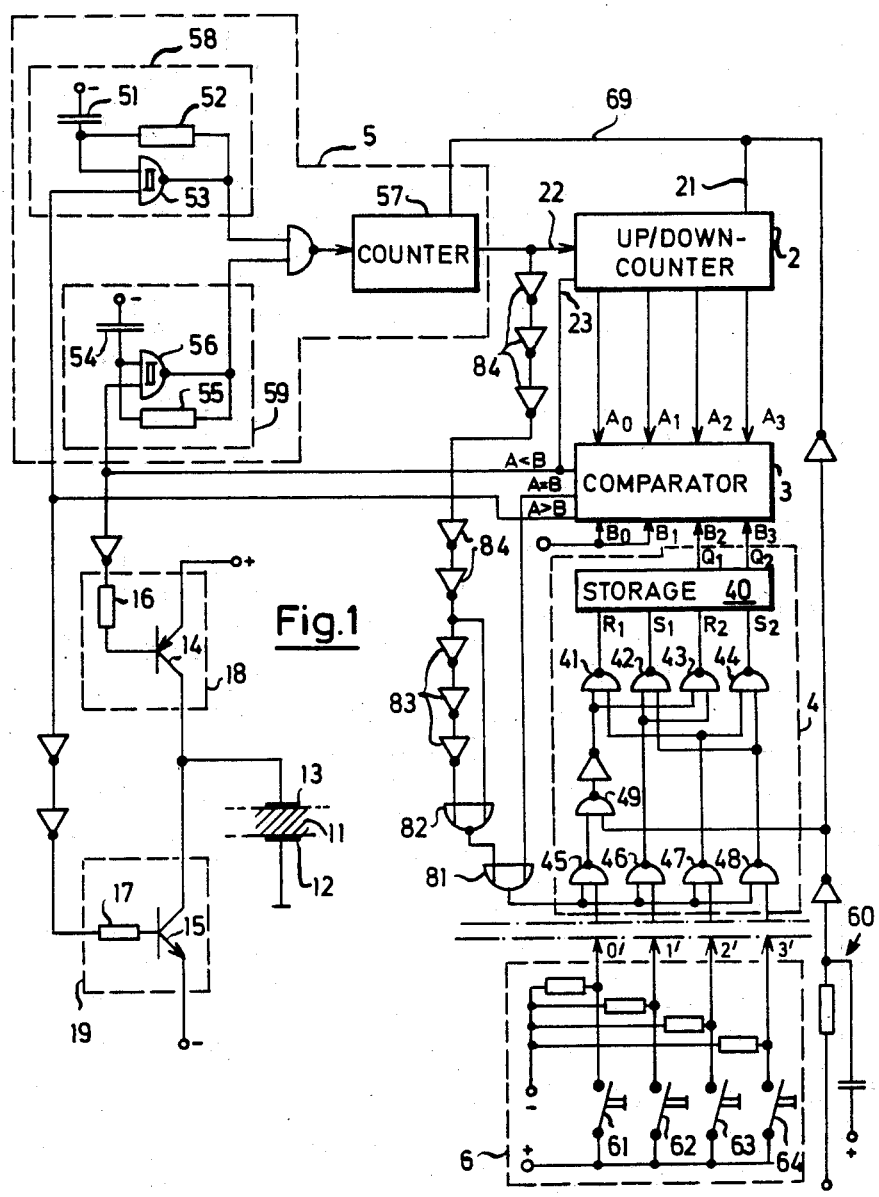
FIG. 1 is a circuit diagram of an embodiment of the invention with push keys for entry of selected guide values.

FIG. 1 schematically shows an electrochromic layer 11 having one electrode 12 at zero potential and its other electrode 13 connected to constant-current sources 18 and 19. The constant-current sources 18 and 19 consist of a PNP transistor 14 and an NPN transistor 15 whose respective emitters are connected to positive and negative poles of a voltage source and whose common junction point is connected to the electrochromic layer. The transistors 14 and 15 are controlled via base resistors 16 and 17 the value of which determines and limits the charge current and charge-removal current for the layer, via the current amplification of the transistors alone. During a coloring process, PNP transistor 14 is conducting, and during a decoloring process, NPN transistor 15 is conducting.

Charging and discharging currents for the electrochromic layer are connected and disconnected by operation of a comparator 3. The latter digitally compares a guide value (present at its B-input side and stored in a network 4) with the instantaneous value from a forward/backward counter 2, the latter being presented at the A-input side of the comparator 3. In the embodiment shown, inputs $B_0$ and $B_1$ are fixed at $\emptyset$, in which case, the guide value is limited to four binary combinations. The binary value supplied by the forward/backward counter is, however, a four-digit number in the embodiment shown; the state A=B can therefore only be present when the two low-order digits of the forward/backward counter 2 have the value $\emptyset$.

Comparator 3 is also connected via control lines to a generator 5 of clock signals forming the basis of layer-charge control. The clock generator contains two generators 58 and 59, to produce different frequencies as determined by capacitors 51 and 54, resistors 52 and 55, and Schmitt-trigger NAND gates 53 and 56; the use of one or the other of these generators 58 and 59 is subject to control as a function of the direction of coloring. For a coloring process, the clock with the lower frequency is connected, and for a decoloring process, the clock with the higher frequency is connected. The counter 57 merely downwardly divides clock frequency.

As long as comparator 3 notes that the guide value at the output of network 4 is greater than the instantaneous counter reading in the forward/backward counter 2, the output "A<B" is activated; in this first circumstance, the end stage (18) is switched on for coloring, the lower-frequency generator 59 is connected, and the forward/backward counter 2 is connected in its forward (up-counting) direction via an input 23. Should the guide value be less than the instantaneous counter reading, output "A>B" is activated; in this alternative circumstance, the end stage (19) is switched on for decoloring, and the higher-frequency generator 58 is connected, it being noted in the then-inactive condition of the ouput "A<B" counter 2 will (as always) have been reset to its backward (down-counting) direction. When the guide value equals the instantaneous counter reading, both the comparator output "A<B" and the comparator output "A>B" become inactive and thus block both end stages (18 and 19) and the timer (5); the electrochromic layer is not changed, and the forward-backward count at 2 remains stationary.

Network 4 is a guide-value encoding and storage device in which signals from the push-key or alternative circuits 6 or 7 or 8 (FIGS. 1 or 2 or 3) are suitably encoded and stored. Its manner of operation will be described in conjunction with the push-key circuit 6, which is shown to comprise four push-key switches 61 to 64, for setting four different states of the electrochromic layer. Actuation of switch 61 connects for achievement of the completely decolored state, and switch 64 for the completely colored state. But, for example, the intermediate switch 63 is depressed then, via an encoding device, comprising four NAND gates 41 to 44, an "H" signal is present at the input $R_1$ of flip-flop storage means 40 and an "H" signal is present at the input $S_2$. As a result, the output of the flip-flop means 40 assumes the bit combination $Q_1$="L" and $Q_2$="H". The flip-flop means 40 retains (stores) this initial state until another key is depressed.

Since the selected guide value is thus stored, it is sufficient merely to briefly depress a given one of the keys 61 to 64 in order to impart a desired state. The desired state of color is then obtained, regardless of how long the same key is kept depressed.

When setting up the circuit of FIG. 1, care must be taken to assure a well-defined initial state, it being noted that the completely decolored state is the most favorable. Thus, when operating voltage is connected, the described switch situation of the key 61 via NAND gate 49 is simulated by an RC network 60 and, at the same time, the forward/backward counter 2 is set (via a setting input 21) at the highest possible binary combination. In this way, the decoloring process is carried out, via operation of comparator 3, to such an extent that even a completely colored layer becomes definitely and completely decolored. Further, when the operating-voltage connection is made, counter 57 is set to zero via a reset line 69.

Figure 2:
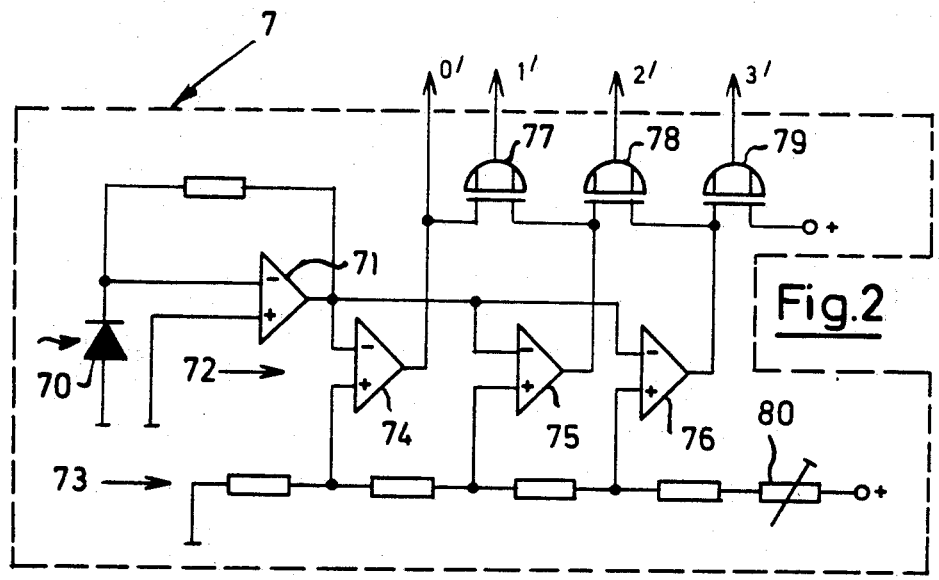
FIG. 2 is a circuit diagram to provide automatic production of guide values through use of an optical sensor, the circuit of FIG. 2 being an alternative for the push-key components of FIG. 1.

In an advantageous modification of the described circuit, the push-key control means 6 is replaced by the circuit of FIG. 2, to produce brightness-controlled guide values from the output of an optical sensor, connected via discrete level-determining outputs 0'-1'-2'-3', to the encoding and storage network 4 of FIG. 1. For such brightness-controlled guide-value production, shunting current of a photodiode 70 (which has a strictly linear relationship to illumination intensity) is amplified by an operational amplifier 71 and supplied to a comparator chain 72 whose non-inverting inputs are tied to spaced points of a voltage-dividing resistance network 73. Depending on illumination intensity, one or more of the outputs of comparators 74 to 76 is in its digital "L" state, and exclusive-OR gates 77 to 79 convert the involved digital signal into a form which can be used by the encoding and storage network 4 (FIG. 1); specifically, in every case, a given one of signal lines 0'-1'-2'-3' activated to its "H" state represents a given degree of illumination. The outputs of the brightness-controlled circuit of FIG. 2 therefore act in the same manner as push-keys 61 to 64 in FIG. 1; and it will be understood that in FIG. 2, comparator thresholds can be shifted via a potentiometer 80 to adjust the absorption steps to lie at different levels.

The described A/D-conversion comparator chain has the advantage of avoiding the relatively severe battery load which characterizes the otherwise-conventional A/D converters, because the low electrical-current requirements of the A/D-conversion comparator chain are much smaller than the current requirements of a conventional A/D converter.

Figure 3:
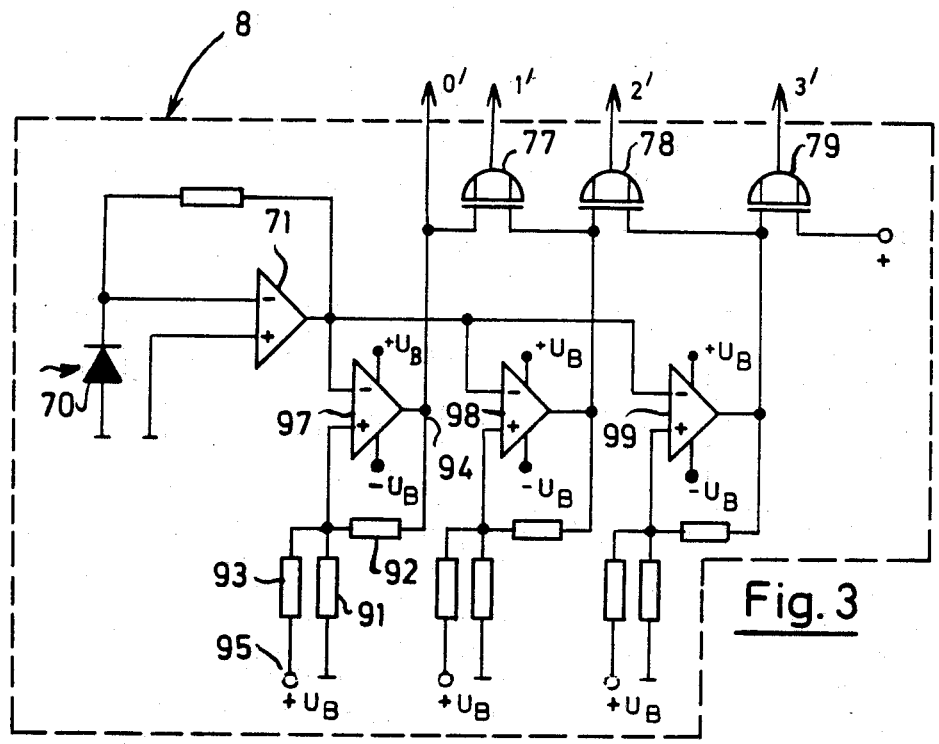
FIG. 3 is a circuit diagram of a modification of FIG. 2 wherein a hysteresis distortion is used to convert the output of the optical sensor into digital signals.

FIG. 3 shows a particularly advantageous further development of the circuit of FIG. 2, in that the latter can be subject to a disadvantage. For example, if in FIG. 2 the signal from sensor 70 and amplified at 71 happens to have the value of a switch step, then a succession of unnecessary control processes may be initiated by slight value variations. The circuit of FIG. 3 is operative to prevent such an occurrence, by introducing switching-hysteresis in the response of the comparators of the A/D converter. To this end, the voltage divider 73 of FIG. 2 is dispensed with, and each comparator is provided with its own voltage divider. For operational amplifier 97, the associated voltage divider is defined by resistors 91 and 93. Instantaneous output voltage of operational amplifier 97 is fed back by a resistor 92 to the voltage divider (resistors 91 and 93) and thus influences their division ratio. If the amplifier output voltage $U_A$ at circuit point 94 is equal to the voltage $U_B$ at circuit point 95, and if the amplified sensor (70) signal has not yet reached the switch step, resistor 92 increases the division ratio and raises the switch threshold. If $U_A = -U_B$ (i e., if the amplified sensor signal is greater than the switch step), then resistor 92 decreases the division ratio and reduces the switch threshold. In this connection, the magnitude of the switch threshold U is given by $$U = \frac{R_{91} R_{92}}{R_{91} R_{92} + R_{93}(R_{91} + R_{93})} U_B$$

and the width of the hysteresis $\pm \Delta U$ is given by $$\pm \Delta U = \pm \frac{R_{91} R_{93}}{R_{91} R_{93} + R_{92}(R_{91} + R_{93})} U_B$$

These equations apply for symmetrical operating voltages at the operational amplifiers 97 to 99. It is possible to make these operating voltages asymmetrical, in which case the equations must be modified accordingly.

The further switch steps of FIG. 3 are developed in corresponding manner, involving operational amplifiers 98 and 99. Exclusive-OR gates 77–79 convert a resulting digital signal, in the same way as in FIG. 2, into the form suitable for encoding and storage in network 4 of FIG. 1. It will be understood that resistors for the voltage dividers (for example, at 91 and 92) can be also adjustable, in which case each switch step can be adjusted independently of the others.

In the embodiment thus far described, a new coloring or a new decoloring process can be initiated even if the preceding one has not yet been concluded. Since the forward/backward counter 2 does not detect the coloring and decoloring process continuously but rather does so in steps, an allocation inaccuracy is possible. This can be avoided by assuring that a new coloring or decoloring process will initiate only if the A=B output (at the comparator 3 of FIG. 1) is activated or if the forward/backward counter 2 has just jumped to a new value. For this purpose in FIG. 1 a number of NAND gates 45–48 are provided in front of the encoding circuit 4; these NAND gates 45–48 are connected via an OR gate 81 to the A=B output of comparator 3 and to the output of clock generator 5. A flank-differentiating network in the form of a NOR gate 82 and an uneven number of inverters 83 for differentiation of the negative flank and an uneven number of inverter and delay elements 84 (for inverting and delaying the output signal of the clock generator 5) are arranged in the connection to clock generator 5. Such delay is necessary so that release for a new guide value will occur only when the new value is actually present at the output of the forward/backward counter 2. Of course, the switch points may also be derived from one of the outputs or from a logic device serving several outputs of the forward/backward counter 2, and this is particularly advantageous when a new guide value is not to be permitted for each change in binary combination.

Figure 4:
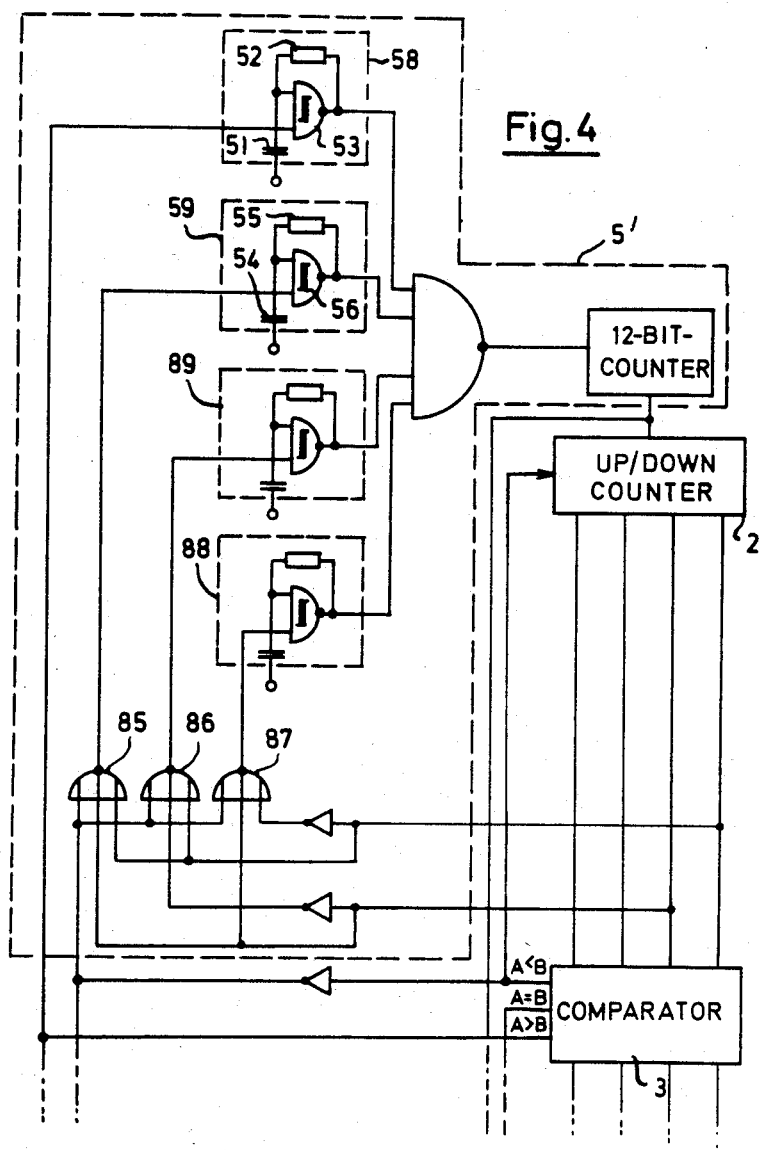
FIG. 4 is a circuit diagram to provide availability of a plurality of clock frequencies for operation of the coloring process.

FIG. 4 shows another advantageous development of the invention in which, in contrast to FIG. 1, means 5' includes three generators of different clock frequencies for use in coloring-process control. Provision of plural generators enables accommodation of a non-linear property of electrochromic layers, namely, that in the coloring process, the change in absorptance does not increase proportionally to the supplied charge but becomes less as the layer becomes increasingly colored. (On the other hand, in the decoloring process there is a linearity between the charge removed and the change in absorptance.)

In FIG. 4, the three different generators for the coloring process are designated 59, 88 and 89; their individual constructions correspond precisely to what has been described in connection with clock generator 59 in FIG. 1. The selection of which individual clock generator is to be active during the coloring process is effected via the binary combination of the two highest-order outputs of the forward/backward counter 2. The interrelation of signals necessary for this is effected at NOR gates 85 to 87, together with interrelation of the "A<B" output of comparator 3. If, for example, the electrochromic layer is completely decolored and comparator 3 contains a guide value for coloring, then the "A<B" output of the comparator is at "H" and thus the corresponding inputs of NOR gates 85 to 87 are at "L". At the forward/backward counter 2, the two highest-order outputs $Q_2$ and $Q_3$ are at "L". In this way, all inputs are at "L" only at NOR gate 85, and the generator 59 is free, to provide clock pulses. All other generators remain inactive.

With the arrangement shown in FIG. 4, not only are uniform color steps obtained but also a better reproducibility of the steps, since the quantities of charge, differently supplied in the coloring process, correspond more precisely to the corresponding steps in the decoloring process.

The described method and arrangement can be used to particular advantage, for example, in sunglasses. Known sunglasses with variable absorptance through use of phototropic lenses have the disadvantage that changes in absorptance take place too slowly and that they operate inadequately behind the windshield of an automobile. Electrochromic layers do not have these disadvantages. In the case of sunglasses, the described circuitry enables an electrochromic layer on each lens to be either manually set (via push-keys) for a selected one of four different absorptances, or automatically via a brightness control. Of course, a greater or lesser number of absorptances is also possible. It it also advantageous to develop the push-keys as so-called contact sensors. The described arrangements are particularly advantageous in optically finished prescription glasses, which can thereby be used both as ordinary eyeglasses and as sunglasses. It is furthermore possible to color the eyeglass lenses, by different electrodecontacting techniques, more strongly in the upper region than in the lower region and thus to obtain the effect of so-called automobile drivers sunglasses, wherein the instrument panel is viewed through the less colored part.

Optical instruments provide another field of use particularly when a ray path is to be temporarily weakened. Thus, for example, it is desirable in microscopes that the image have approximately the same brightness at all times, regardless of the magnification set. For this purpose, a flat plate of glass having an electrochromic layer is arranged at a suitable point in the ray path of the microscope, and its absorptance is changed by one of the described arrangements. Thus, for example, keys 61 to 64 can be mechanically actuated by direct coupling to the magnification changer or to the lens turret. In microscopes with a zoom enlargement device, automatic control with an optical sensor as described in connection with FIGS. 2 and 3 is particularly advantageous. In all cases, the electrochromic layer can also be applied to an optical part which is already part of the apparatus.

A further field of use stems from optical arrangements in which a required difference in reflectivity is replaced by a difference in absorptivity. One example of this consists of dimmable automobile rearview mirrors. Known devices consist of a plate of glass and a mirror therebehind, the latter being swung away when incident light is too great. This solution, however, has disadvantages: the mirror must be swung away by hand, which is possible with little mechanical expense only in the case of inside mirrors. Automation or remote-actuation is possible only at relatively high expense. On the other hand, with the invention, a change or changes in reflectivity can also be obtained by a (fixed) glass plate which is mirror-finished on its rear surface and which has an applied electrochromic layer on its front surface. The arrangement described in connection with FIG. 1 enables one to obtain different dimming effects through selective key actuation, a feature which is particularly advantageous in the case of outside mirrors; and there is also the general advantage that the keys can be located entirely independently of the mirror. With the inventive alternatives described in connection with FIGS. 2 and 3, the dimming or brightening action is automatically effected, so that the driver is freed from the need of performing any mirror-control function.

What is claimed is:

1. Apparatus for step-wise charge control of an electrochromic layer, said layer being in uncolored state for the condition of no charge in said layer, said layer being colored to a first state for a first charge in said layer, and said layer being colored to a second and greater colored state for a second and greater charge in said layer, said apparatus comprising: selectively operable means for selecting a change of layer state to one of said states regardless of the currently existing state of said layer; said selectively operable means including comparator means responsive both to the existing state and to the selected state and having (1) a first control output for the case of the layer in the selected state being more colored than in the existing state ($A < B$), (2) a second control output for the case of the layer in the selected state being less than in the existing state ($A > B$); a constant-current charging circuit connected to charge said layer in the event of a signal in said first control output; a constant-current charge-removal circuit connected to remove charge from said layer in the event of a signal in said second control output; first interval-timing means connected for response to said first control-output signal and connected to said charging circuit to determine a timed incremental charge in said layer in the direction of increased color development in said layer, and second interval-timing means connected for response to said second control-output signal and connected to said constant-current charge-removal circuit to determine a timed decremental removal of charge from said layer, the timed interval for a charging increment to produce a given layer-coloring increment under control of said first interval-timing means being greater than the timed interval for a corresponding decrement of charge removal to produce a corresponding color-removing decrement under control of said second interval-timing means, and said decrement of color removal being selected to be slightly in excess of the increment of layer coloring, whereby regardless of the number of selected increment-decrement cycles there will be no cyclic growth in the coloring of said layer.

2. Apparatus according to claim 1, in which said first interval-timing means includes a first generator of clock pulses and said second interval-timing means includes a second generator of clock pulses, said first generator producing pulses of lower repetition frequency than the repetition frequency of second-generator pulses, and counting means connected to both of said generators to count a predetermined number of clock pulses, whereby for a first control-output signal the predetermined number of counted first-generator pulses will determine a greater interval than said predetermined number of counted second-generator pulses in the event of a second control-output signal.

3. Apparatus according to claim 1, in which said first and second colored states are part of a greater plurality of colored states for a corresponding plurality of different charges in said layer.

4. Apparatus according to claim 2, in which said counting means includes a forward/backward counter whereby a reading of said counter characterizes the state of the color of said layer.

5. Apparatus according to claim 4, in which said selectively operable means includes means for selecting one of a plurality of predetermined counter readings corresponding to a desired one of a plurality of states of the color of said layer, and in which said comparator means is responsive to the selected counter reading and to the existing counter reading.

6. Apparatus according to claim 5, in which the maximum selectable counter reading corresponds to the maximum tolerable charge in said layer.

7. Apparatus according to claim 5, in which the means for selecting one of a plurality of predetermined counter readings comprises one key for each of said plurality, and storage means (40) and encoding means (41 to 44) associated with the respective keys.

8. Apparatus according to claim 5, in which the means for selecting one of a plurality of predetermined counter readings comprises an optical sensor (70) electrically responsive to sensed brightness, and an A/D converter connecting the output of said sensor to said comparator means.

9. Apparatus according to claim 8, in which said A/D converter is in the form of a comparator chain (72).

10. Apparatus according to claim 8, in which said A/D converter comprises a plurality of operational amplifiers (97 to 99) connected as differential voltage compensators with hysteresis.

11. Apparatus according to claim 2, in which said first clock-pulse generator is one of a plurality of different clockpulse generators available for use in the incrementing of charge in said layer, each of the generators of said plurality being of different characteristic pulse-repetition frequency, whereby a different interval is timed by each generator of said plurality for the predetermined number counted by said counting means, and means responsive to the existing state of said counting means for determining which one of said plurality of generators is to be connected for a further coloriing of said layer, whereby each one of said plurality of generators may serve a different fraction of any non-linearity in the coloring response of said layer.

12. Apparatus according to claim 2, in which (a) said counting means includes a forward/backward counter, (b) said comparator means includes an A=B output, and (c) said selectively operable means includes a coding device (41 to 44) having an input characterized by a plurality of NAND gates (45 to 48) connected via an OR gate (81) to said A=B output, said OR gate (81) being also connected via a flank-differentiating network (82, 83), and inverter and delay elements (84) to the input (22) of the forward-backward counter.

13. Apparatus according to claim 2, in which (a) said counting means includes a forward/backward counter, (b) said comparator means includes an A=B output, and (c) said selectively operable means includes a coding device (41 to 44) having an input characterized by a plurality of NAND gates (45 to 48) connected via and OR gate (81) to said A=B output, said OR gate (81) being also connected via a flank-differentiating network (82, 83) and logic elements to the output of the forward-/backward counter.

14. Apparatus according to claim 1, in which each of said constant-current circuits utilizes the emitter circuit of a transistor (14, 15) as the constant-current source, the respective transistors being connected via base resistors (16, 17) to said comparator means.

15. Apparatus according to claim 1, wherein said electrochromic layer is an element of a sunglass lens.

16. Apparatus according to claim 1, wherein said electrochromic layer is an element of a dimmable mirror.

17. Apparatus according to claim 1, wherein said electrochromic layer is an element of an optical filter.

* * * * *